No. 673,020. Patented Apr. 30, 1901.
F. & O. A. HAENICHEN.
ELECTRIC PENDULUM CLOCK.
(Application filed Jan. 10, 1900.)

(No Model.) 5 Sheets—Sheet 1.

WITNESSES:

INVENTORS
Frederick Haenichen
Otto A. Haenichen
BY
ATTORNEYS.

No. 673,020. Patented Apr. 30, 1901.
F. & O. A. HAENICHEN.
ELECTRIC PENDULUM CLOCK.
(Application filed Jan. 10, 1900.)

(No Model.) 5 Sheets—Sheet 2.

FIG. 3.

WITNESSES:

INVENTORS
Frederick Haenichen
Otto A. Haenichen
BY

ATTORNEYS

No. 673,020. Patented Apr. 30, 1901.
F. & O. A. HAENICHEN.
ELECTRIC PENDULUM CLOCK.
(Application filed Jan. 10, 1900.)
(No Model.) 5 Sheets—Sheet 3.

WITNESSES: INVENTORS
Frederick Haenichen
Otto A. Haenichen
BY
ATTORNEYS

No. 673,020. Patented Apr. 30, 1901.
F. & O. A. HAENICHEN.
ELECTRIC PENDULUM CLOCK.
(Application filed Jan. 10, 1900.)

(No Model.) 5 Sheets—Sheet 4.

WITNESSES:

INVENTORS
Frederick Haenichen
Otto A. Haenichen
BY
ATTORNEYS

No. 673,020. Patented Apr. 30, 1901.
F. & O. A. HAENICHEN.
ELECTRIC PENDULUM CLOCK.
(Application filed Jan. 10, 1900.)

(No Model.) 5 Sheets—Sheet 5.

WITNESSES:
INVENTORS
ATTORNEYS

UNITED STATES PATENT OFFICE.

FREDERICK HAENICHEN AND OTTO A. HAENICHEN, OF PATERSON, NEW JERSEY.

ELECTRIC PENDULUM CLOCK.

SPECIFICATION forming part of Letters Patent No. 673,020, dated April 30, 1901.

Application filed January 10, 1900. Serial No. 918. (No model.)

*To all whom it may concern:*

Be it known that we, FREDERICK HAENICHEN and OTTO A. HAENICHEN, citizens of the United States, residing in Paterson, in the county of Passaic and State of New Jersey, have invented certain new and useful Improvements in Electric Pendulum Clocks, of which the following is a specification.

Our invention relates to certain improvements in the electric pendulum clock for which Letters Patent of the United States were granted to us heretofore, No. 316,360, dated April 21, 1885, and No. 342,086, dated May 18, 1886, said improvements being based on the same fundamental principle as the electric pendulum clock shown in said patents and intended to simplify the construction of the current-reverser and improve the general mechanical construction of the clock in such manner that the absolutely reliable working of the same is obtained, which not only meets ordinary requirements, but also the more exacting scientific requirements.

The invention consists of an electric pendulum clock in which the impulse is imparted to the pendulum by the armature of an actuating-electromagnet in connection with a weighted impulse-rod and a current-reverser, by which alternately currents of opposite polarity are thrown through the coils of the electromagnet for neutralizing the residual magnetism in the cores of the same. The current-reverser is supported on the crutch of the pendulum, oscillated with the same, and operated in connection with a beat-regulating spur-wheel, that is actuated by a push-pawl on the crutch. The oscillations imparted to the pendulum are transmitted to the arbor of the seconds-hand by a seconds-wheel operated by push-pawls on the crutch, while the motion of the minute and hour hands is produced by suitable minute and hour spur-wheels operated by suitable snails, levers, and pawls. The impulses are imparted to the pendulum by the weighted and independently-suspended impulse-rod, a lateral arm of which is engaged by a lever-arm on the armature of the electromagnet, said impulse-rod being raised when the armature is attracted, but dropped when the armature is released.

The invention consists, further, of certain details of construction, which will be fully described hereinafter and finally pointed out in the claims.

In the accompanying drawings.

Similar letters of reference indicate corresponding parts.

In our improved electric pendulum clock two batteries and two circuits are employed, one battery and its circuit supplying a positive current while the other battery and its circuit supply a negative current to the actuating-electromagnet of the clock. Any approved type of battery may be employed; but it is preferable to employ batteries which have the property of furnishing weak currents for a considerable length of time without replenishing.

B B' represent the batteries, which are located either in the clock-case itself or at any suitable place outside of the same.

A is the electromagnet, which is supported on a suitable bracket below the clock mechanism and provided with a nicely-balanced armature A', the armature-lever $a$ of which is supported at the upper end of the spring-cushioned piston-rod $a'$ of a pneumatic brake $A^2$. The armature-lever $a$ is provided at one end with an adjustable weight $a^2$ and with a felt or other cushion $a^{3'}$ which forms contact with a similarly-cushioned upright post $A^3$, so that the contact of the armature-lever $a$ with said post takes place in a noiseless manner. The opposite end $a^4$ of the armature-lever $a$ is adjustable in a sleeve $a^5$, that is insulated from the armature-lever $a$ and end $a^4$ of the same. On the armature, which is pivoted by means of pins $t$ upon the electromagnet, which enter corresponding recesses of the armature, is mounted an upwardly-extending lever-arm C, which carries at its upper end an inclined adjusting-screw $C'$, that is provided at its upper end with a knurled disk for adjusting the same in the end of the lever-arm C, while its opposite pointed end forms contact with a disk-shaped plate $d$ at the end of a lateral arm $d'$, extending from an impulse-rod D, which carries at its upper part a disk-shaped weight $D'$. The upper end of the impulse-rod D is suspended from a steel pivot $d^2$, that turns by its conical ends in suitable bearings on the top bracket $f$ of the supporting-frame F of the clock. The lower end of the impulse-rod D is provided with a forwardly-extending portion $d^3$, that serves to engage the pendulum P on one side. The weighted impulse-rod D is intermittently actuated by the lever-arm C of the armature $A'$ when the latter is attracted by the electromagnet, so as to lift the impulse-rod away from the pendulum until its weight $D'$ abuts against a stop $d^4$, attached to the rear plate of the clock-frame. As soon as the armature is released from the cores of the electromagnet A the weighted impulse-rod D is released by the receding motion of the lever-arm, so that an impulse is imparted to the pendulum by the contact of the forwardly-extending portion of the impulse-rod D with the pendulum.

The pendulum P is suspended, by means of a steel spring, in the usual manner from the top bracket $f$ of the supporting-frame F. It may be made of any suitable length.

Figure 7:
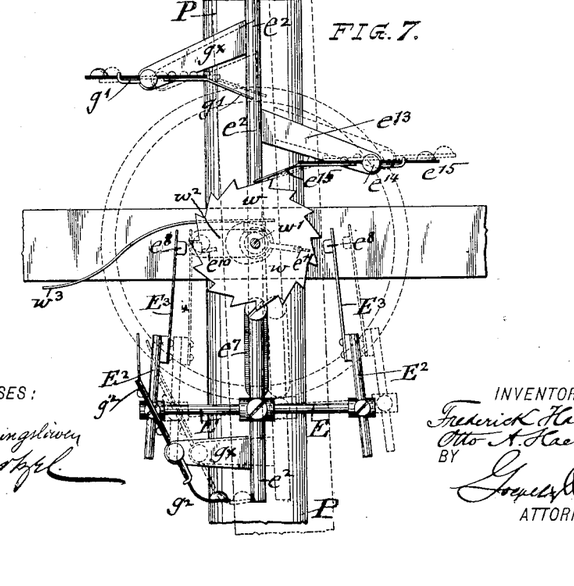
Fig. 7 is a front elevation of the crutch and current-reverser, drawn on a still larger scale, and of the beat-regulating spur-wheel.

In front of the pendulum P is arranged a crutch $e^2$, on which is mounted the current-reverser. The crutch $e^2$ is attached at its upper end to a steel pivot $e$, having conically-tapering ends, which are supported in bearings of steel plates $e'$, that are attached to the top bracket of the supporting-frame. To the crutch $e^2$ is applied near its lower end an adjustable sleeve $e^3$, that is secured to the crutch by a set-screw $e^4$ and provided with a downwardly-extending arm $e^5$ back of the crutch, that carries at its lower end a rearwardly-extending pin $e^6$, which enters a longitudinal slot $e^7$ in the pendulum, so that the crutch is oscillated with the pendulum. The crutch $e^2$ is provided below the pin $e^6$, connecting it with the pendulum, with lateral arms E, which are secured by means of a perforated sleeve and a set-screw at right angles to the crutch, said lateral arms being provided at their ends with forwardly-extending arms $E'$, which carry at their front ends upwardly-extending and slightly-converging arms $E^2$. The arms $E^2$ carry at their upper ends slotted contact-springs $E^3$, that are provided with two thin parallel platinum contact-plates $e^8$. The contact-plates $e^8$ are arranged in the same vertical plane, but at right angles, with two additional platinum contacts $e^{10}$ $e^{11}$, of which the contact $e^{10}$ is applied to a spur-wheel $w$, while the other contact $e^{11}$ is arranged at the same distance from the arbor $w'$ of the spur-wheel $w$ as the contact $e^{10}$ at the end of an arm $e^{12}$, which extends from an insulated sleeve $e^9$ on the arbor $w'$. The arbor $w'$ is supported in suitable bearings of the supporting rear plates $p'$ $p^2$ of the clock-train, which rear plates $p'$ $p^2$ and the front plates $p^3$ $p^4$ are connected by horizontal posts $p$, on which the plates are supported at approximately equal distances from each other by means of screw-nuts, as shown clearly in Fig. 4. The front end of the arbor $w'$ turns by means of its conically-tapering front end in a corresponding bearing of the supporting-plate $p^2$, while the rear end of the arbor $w'$ passes through a hole in the rear plate $p'$ and is in contact with a spring $w^2$, which presses on the rear end of the arbor $w'$, as shown clearly in Fig. 5. A flat contact-spring $w^3$, that is supported on a bracket $w^4$, attached to the rear plate of the clock-frame F, is placed in electric contact with the rear part of the sleeve $e^9$, while the contact-spring $w^2$ is in electric contact with the arbor $w'$. The crutch $e^2$ is provided above the spur-wheel $w$ with a downwardly-extending arm $e^{13}$, which carries a horizontal forwardly-extending pin $e^{14}$, to which is applied an insulated push-pawl $e^{15}$, that serves to engage the teeth of the spur-wheel $w$, as shown clearly in Fig. 7. A check-pawl $e^{16}$, attached to the bracket $w^4$, also engages the teeth of the spur-wheel $w$. The spur-wheel $w$ is provided with fifteen teeth, one of the teeth being made longer than the other teeth. At each oscillation of the pendulum P from the right to the left the push-pawl $e^{15}$ of the crutch $e^2$ engages the teeth of the spur-wheel $w$ and moves the same on its axis for the distance of one tooth. At each full rotation of the spur-wheel the platinum contact-plate of the spur-wheel $w$, as well as the platinum contact-plate $e^{11}$, carried by the sleeve $e^9$, are placed in line with the platinum contact-plates on the springs $E^3$. Simultaneously therewith the push-pawl $e^{15}$ arrives on the longer tooth of the spur-wheel $w$. At each oscillation of the pendulum from one side to the other and back the contact-plates $e^8$ engage alternately the contact-plate $e^{10}$ of the spur-wheel and the contact-plate $e^{11}$ of the sleeve, so that either the circuit of the battery B or that of the battery $B'$ is closed. At each oscillation of the pendulum and its crutch toward the left the push-pawl $e^{15}$ moves the spur-wheel $w$ forward for one tooth without imparting an impulse to the pendulum by means of the weighted rod D. When the push-pawl $e^{15}$ arrives on the longer tooth, it slides over the tooth without imparting a turning motion to the spur-wheel. When the spur-wheel and push-pawl are in this position, the oscillation of the pendulum and crutch toward the right produces the contact of the left-hand platinum contact-plates $e^8$ with the platinum plate $e^{10}$ on the spur-wheel $w$, so as to close thereby the circuit of the battery B, whereby a positive current is passed from said battery through the coils of the electromagnet, from the same to the crutch $e^2$ of the current-reverser, then to the left-hand contact-spring $E^3$ and platinum contact-plates $e^8$ to the contact-plate $e^{10}$ on the spur-wheel, and over the spur-wheel and its arbor and the contact-spring $w^2$ back to the negative pole of the battery. The electromagnet is thereby attracted, so that its lever-arm C raises the weighted impulse-rod D. By the next oscillation of the pendulum toward the left hand the contact-plates $e^8$ and $e^{10}$ are separated from each other and the circuit of the battery B broken, but the contact between the right-hand contact-plates $e^8$ and the contact-plate $e^{11}$ established, so that the circuit of the battery B' is closed and a current of negative polarity conducted from the battery through the coils of the electromagnet over the crutch, contact-plates $e^{11}$, sleeve $e^9$, and disconnector F', back to the battery B'. As the armature A' is retained in attracted position by the residual magnetism of the cores of the electromagnet even after the interruption of the circuit of the battery B, it is only released by the negative current which is thrown by the circuit of the battery B' through the coils of the electromagnet, as this current neutralizes the residual magnetism in the cores and causes the instant release of the armature, and thereby the release of the lever-arm, from the weighted impulse-rod D, so that the dropping of the latter imparts an impulse to the pendulum from the left toward the right. When this impulse is of sufficient strength, the pendulum will swing to the right to such an extent that the push-pawl $e^{15}$ will skip the long tooth of the spur-wheel and on the return swing move the same and will continue at each oscillation of the pendulum to engage a tooth and turn the spur-wheel that distance until the long tooth again is reached, when the circuits are again established and another impulse given the pendulum, as before. In most cases, however, the arc of pendulum movement has become so shortened by the time the long tooth is reached that one impulse of the rod D is not sufficient to cause the push-pawl $e^{15}$ to pass said tooth; but as in this case no movement is imparted to the contacts $e^{10} e^{11}$ they are still in position to meet the contacts $e^8$ at each swing of the pendulum, so that the attraction and releasing of the armature continues. At each attraction the lever-arm C imparts an impulse to the rod D, and the latter by its weight D' transmits this power to the pendulum on the return swing. A few such impulses cause the arc of the pendulum to lengthen, so that the push-pawl passes the long tooth and engages the next tooth, thereby turning the wheel $w$ and continuing to turn the same tooth by tooth until the long tooth is again reached, when the operation described is repeated. The disconnector F' is located sidewise of the electromagnet A, near the end $a^4$ of the armature-lever $a$, and composed of a supporting-block $F^2$ and a disconnecting-spring $f^2$, the free end of which engages the end $a^4$ of the armature-lever. The disconnecting-spring $f^2$ is provided with a platinum contact-plate $f^3$, which is arranged at right angles with a second platinum contact-plate $f^4$ on a slotted and vertically-adjustable slide-piece $F^3$. A set-screw $a^6$ on the end $a^4$ of the armature-lever $a$ is so adjusted that its head will engage the end of the spring $f^2$ and keep its contact-plate $f^3$ out of contact with the contact-plate $f^4$ on the slide-piece $F^3$ when the armature is released. When the armature is attracted, the armature-lever sets the disconnector-spring $f^2$ to tension and presses its platinum contact-plate in contact with the platinum plate below the same, so as to hold the same in this position and secure the closing of the circuit of the battery B' on the return motion of the pendulum. As soon as by the closing of the circuit of the battery B' the negative current is thrown through the current of the electromagnet the armature is repulsed and the disconnecting-spring released by the armature-lever, so that the platinum plates $f^3 f^4$ are separated, and thereby the circuit broken. The repulsion of the armature A' produces the release of the weighted rod D from the arm C, so that it drops and imparts an impulse to the pendulum, which is thereby oscillated from left toward the right. The alternating closing and breaking of the two battery-circuits by the current-reverser is continued until an impulse of sufficient strength is imparted to the pendulum by the dropping of the weighted impulse-rod, so that the push-pawl can finally skip the longer tooth and then cause the renewed rotation of the spur-wheel $w$ of the current-reversing mechanism. The current-reverser and its spur-wheel $w$ serve, therefore, as a means for restoring the pendulum to its normal beat at every fifteenth beat, so as not to require an impulse for every beat of the pendulum, as the circuits of the batteries are only closed a few times for every minute and not at every beat, as with the electric pendulum clocks heretofore in use.

Figure 1:
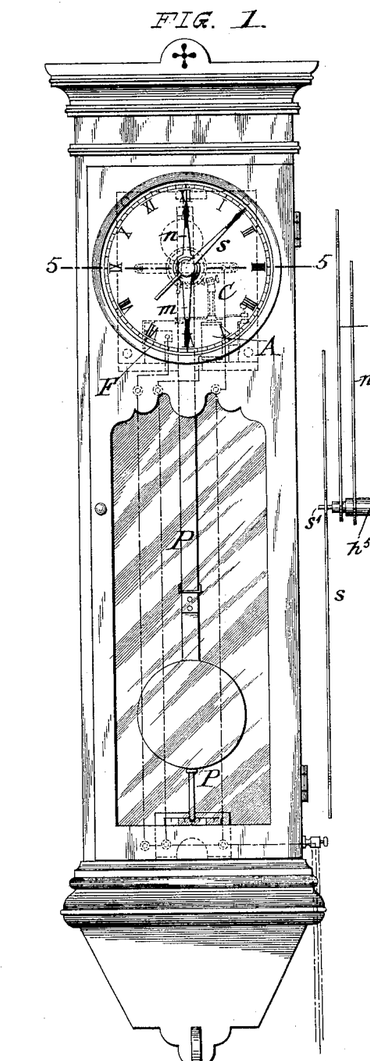
Figure 1 represents a front elevation of our improved electric pendulum clock.
Figure 2:
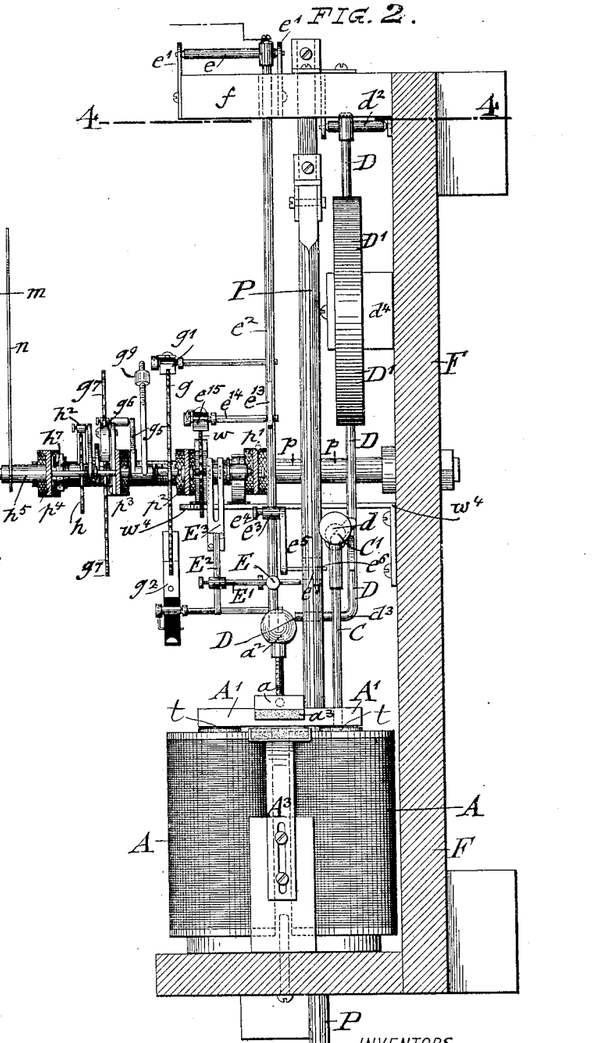
Fig. 2 is a vertical transverse section on line 2 2, Fig. 4, drawn on a larger scale.
Figure 3:
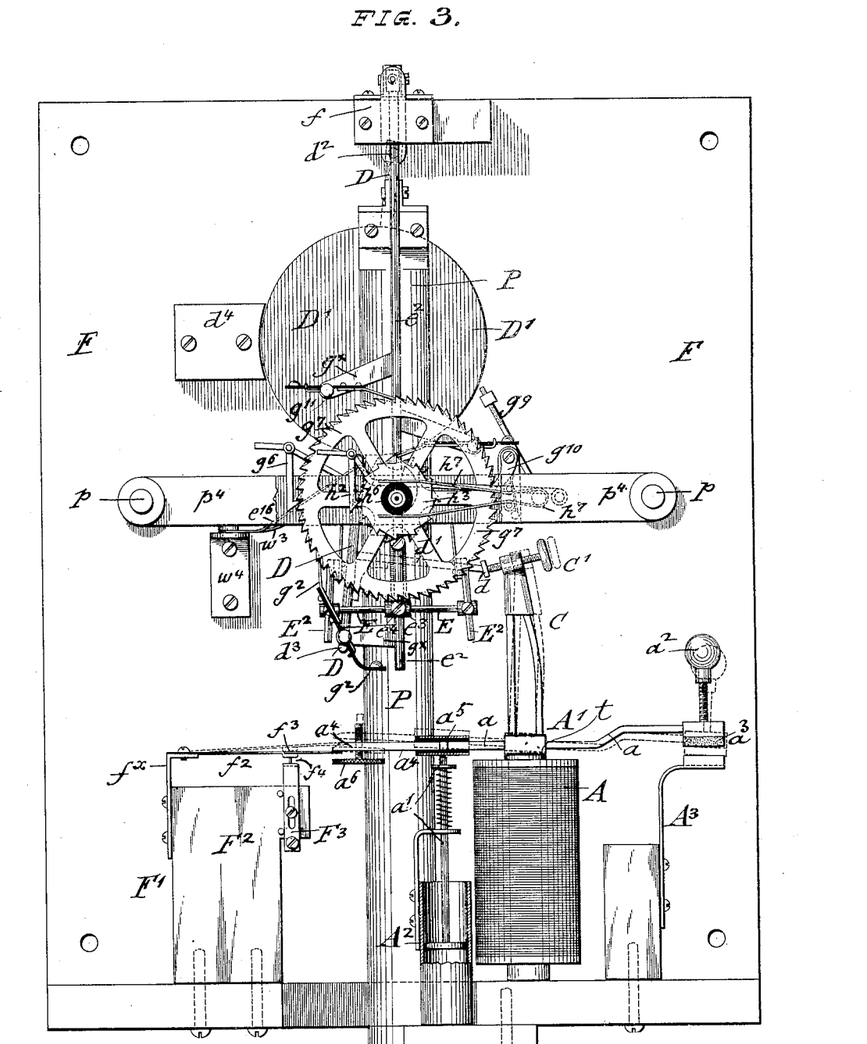
Fig. 3 is a front elevation of Fig. 2, partly in section on line 3 3, Fig. 4.
Figure 4:
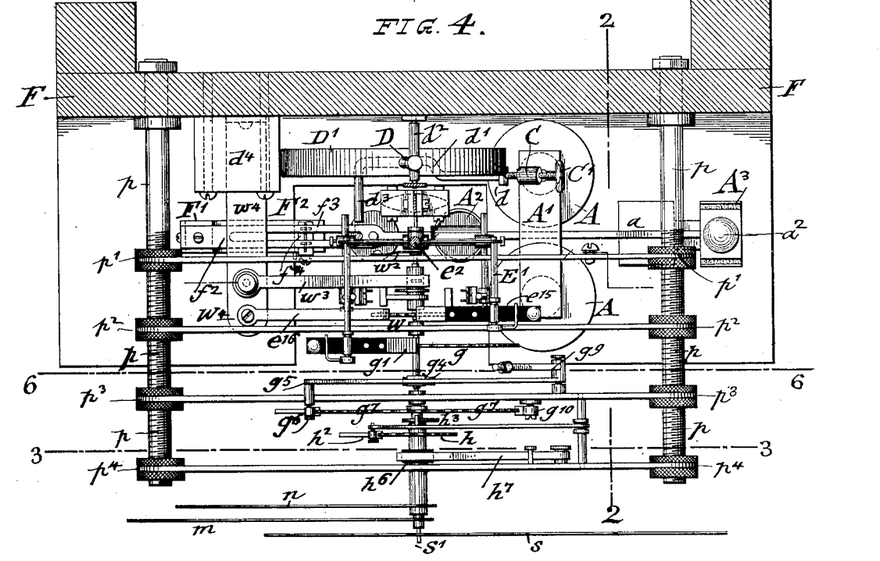
Fig. 4 is a plan view of our improved clock, partly in section on line 4 4, Fig. 2.
Figure 5:
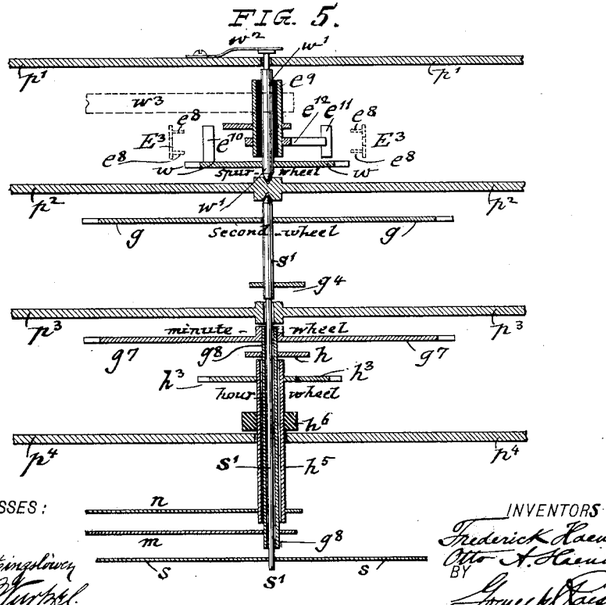
Fig. 5 is a horizontal section on line 5 5, Fig. 1, showing the relative arrangement of the current-reverser and of the wheels for imparting motion to the seconds, minute, and hour hands.
Figure 6:
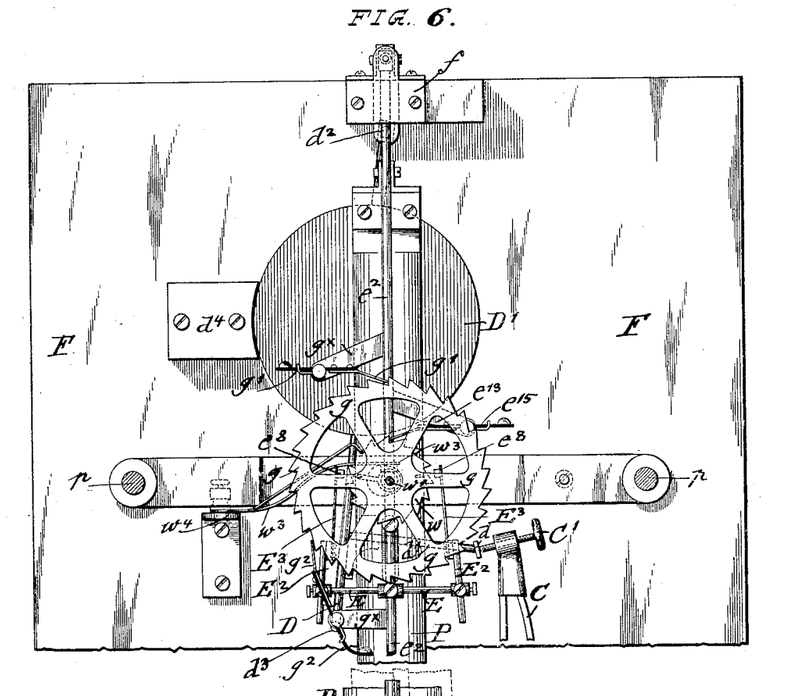
Fig. 6 is a front elevation of the crutch and the seconds-wheel actuated thereby, partly in section on line 6 6, Fig. 4, drawn on a larger scale.
Figure 8:
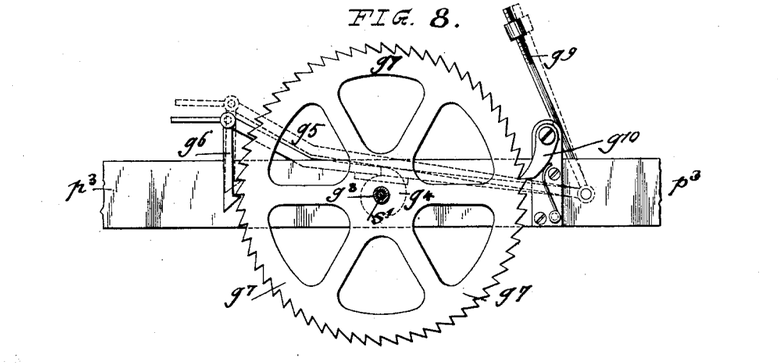
Figs. 8 and 9 are details showing the means for transmitting motion to the minute and hour hands.

The motion of the crutch $e^2$ is transmitted by means of two insulated pawls $g' g^2$, which are applied to arms $g^x g^x$, to a seconds-wheel $g$, which is provided with thirty teeth, as shown in Fig. 6. The arms of the pawls $g' g^2$ are located on the crutch $e^2$, respectively above and below the seconds-wheel $g$, both pawls extending from their arms in the same direction into the teeth of the seconds-wheel $g$. When the pendulum moves toward the right, the upper pawl $g'$ engages a tooth of the seconds-wheel, while when the pendulum is oscillated toward the left the lower pawl $g^2$ engages a tooth of the seconds-wheel, so that at each oscillation of the pendulum the seconds-wheel is moved for the distance of one-half tooth. Each full rotation of the seconds-wheel corresponds to sixty seconds and moves the seconds-hand $s$ once over the dial of the clock. The movement of the seconds-wheel $g$ is continuous and entirely independent of the motion of the spur-wheel of the current-reverser, so that the uniform and uninterrupted motion of the seconds-hand is accomplished. On the arbor $s'$ of the seconds-hand $s$ is placed a snail $g^4$, on which rests a pivoted lever $g^5$, which carries at its outer end a pawl $g^6$. This pawl engages the minute-wheel $g^7$, which is keyed to a hollow arbor $g^8$, that is placed over the arbor of the seconds-wheel. The arbor of the seconds-wheel is supported by its conically-tapering rear end in bearings of the second supporting-plate $p^2$ and passed through a hole in the third plate $p^3$, being supported by a journal-bearing in said plate. The minute-wheel $g^7$ is provided with sixty teeth, its actuating-lever $g^5$ being pivoted at one end to a rearwardly-extending pivot on the third supporting-plate $p^3$ and held in contact with the snail $g^4$ by a weighted arm $g^9$, applied to the pivoted end of the lever, as shown in Fig. 8. The opposite end of the lever $g^5$ carries the pawl $g^6$ on a pivot which extends over the third plate $p^3$, as shown in Fig. 4. When the arbor of the seconds-hand and the minute-snail $g^4$ on the same have made one full rotation, the lever $g^5$ is lifted, together with the pendent pawl $g^6$, so that the minute-wheel is moved for the distance of one tooth. When the arbor of the seconds-wheel has made sixty full rotations, the pawl of the lever $g^5$ has engaged successively all the teeth of the minute-wheel, and thereby moved the minute-hand entirely around the dial. A spring-actuated check-pawl $g^{10}$ is arranged at a point diametrically opposite to the pawl $g^6$, so as to prevent the minute-wheel from being turned in the opposite direction.

Figure 9:
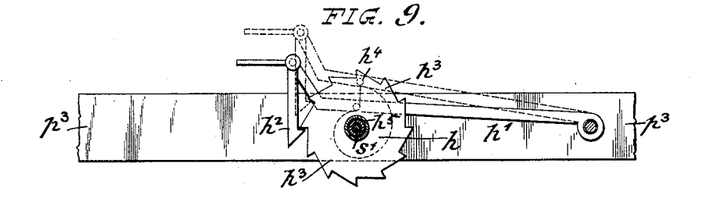
Figure 10:
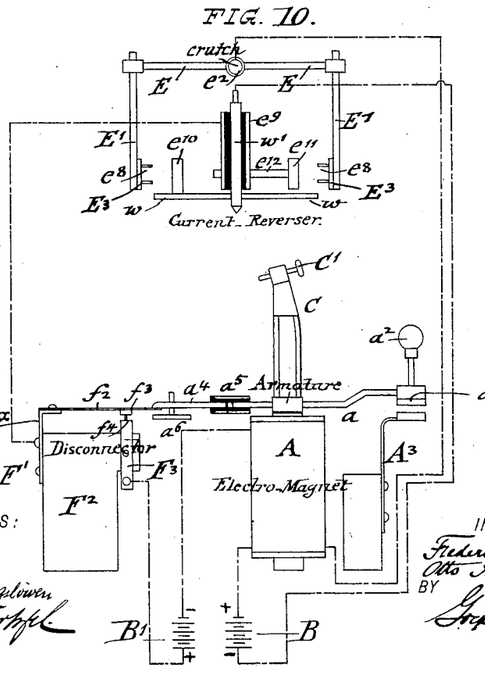
Fig. 10 is a diagram showing the electric connection of the current-reverser with the electromagnet, disconnector, and the two independent battery-circuits supplying currents of opposite directions to the electromagnet.

On the hollow arbor of the minute-hand $m$ is located a snail $h$, of larger size than the snail $g^4$, which operates the minute-wheel lever, which snail $h$ actuates a second smaller lever $h'$, that is attached to an arbor pivoted between the third and fourth plates, as shown in Figs. 4 and 9. The lever $h'$ carries at its opposite end a pendent pawl $h^2$, which engages the hour-wheel $h^3$, that is provided with twelve teeth. The pendent pawl $h^2$ is moved by the rotation of the hour-snail $h$ once for every full hour, so that the hour-wheel is turned for the distance of one tooth. The lever $h'$ is provided with a pin $h^4$, which moves over the circumference of the hour-snail and which drops when it arrives at the point of greatest eccentricity of the snail back to the point of smallest eccentricity, as shown in dotted lines in Fig. 9, in which case the pendent pawl is shown in engagement with the next tooth of the hour-wheel. When the hour-wheel $h^3$ is turned entirely around, the full rotation of the hour-hand $n$ over the dial is accomplished. The hour-wheel $h^3$ is applied to a hollow arbor $h^5$, that is placed on the arbor of the minute-wheel and supported in bearings of the fourth or front plate $p^4$, as shown clearly in Figs. 4 and 5. On the arbor of the hour-wheel $h^3$ is located an insulated collar $h^6$, which is engaged at diametrically opposite points by a V-shaped friction-spring $h^7$, which acts in the nature of a check-pawl, so that the hour-wheel is held in position for being regularly and accurately moved by its actuating-pawl.

The operation of the clock has been described in connection with the description of the impulse-rod, crutch, current-reverser, and the mechanisms for operating the seconds, minute, and hour hands, while the course of the current of the two battery-circuits has been described in connection with the current-reverser, so that no further detailed description of the operation is necessary.

Our improved electric pendulum clock differs from the clock heretofore patented by us in the following particulars:

First That in place of one battery and one circuit for actuating the electromagnet two batteries and two independent circuits are used, one for supplying a current in one direction and the other for supplying a current in the opposite direction. By this arrangement no changing of the direction of the battery-current is necessary, as each battery supplies always its current in the same direction, whereby the batteries will respond more closely to the requirements of the clock and last for a greater length of time.

Second. That in addition to the minute and hour hands a seconds-hand is provided.

Third. That by the improved construction of the current-reverser and its beat-regulating spur-wheel mechanism the more reliable and accurate running of the clock is secured, as at regular intervals of time the beats of the pendulum are restored to their normal size independently of the motions transmitted by the pendulum to the hand-operating devices, while by the arrangement of the platinum contact-plates at right angles to each other very small contact-surfaces are obtained, so that sparking and wear at the contact-points are reduced to a minimum.

Having thus described our invention, we claim as new and desire to secure by Letters Patent—

1. In an electric pendulum clock, the combination of a pendulum, a crutch connected with the pendulum, a current-reverser partly supported on said crutch, an electromagnet, a balanced armature actuated by said electromagnet, an impulse mechanism intermittently actuated by said armature for imparting an impulse to the pendulum, and a beat-regulating device operating in conjunction with said current-reverser to restore to the pendulum a beat of predetermined length at regular intervals of time, substantially as set forth.

2. In an electric pendulum clock, the combination of a pendulum, a crutch connected with said pendulum, a current-reverser partly supported on said crutch, an electromagnet, a balanced armature, an impulse mechanism actuated intermittently by said armature for imparting an impulse to said pendulum, a beat-regulating device operating in conjunction with said current-reverser to restore to the pendulum a beat of predetermined length at regular intervals of time, and motion-transmitting mechanism actuated by the crutch, for imparting motion to the hands of the clock, substantially as set forth.

3. In an electric pendulum clock, the combination of an oscillating pendulum, a crutch connected with said pendulum, two independent circuits, one for sending a current in one direction, the other for sending a current in the opposite direction, an electromagnet in said circuits, a balanced armature, a fulcrumed disconnector operated by said armature, said disconnector being in the second or neutralizing circuit, a current-reverser partly supported on the crutch of the pendulum, said current-reverser being placed altenately in circuit with the battery of the impulse-circuit at one end of its oscillation, and with the battery of the neutralizing-circuit at the other end of its oscillation, and mechanism operated in conjunction with the current-reverser for intermittently restoring the normal beats of the pendulum, substantially as set forth.

4. In an electric pendulum clock, the combination of an oscillating pendulum, a crutch connected with said pendulum, a current-reverser partly supported on said crutch, an impulse mechanism, an electromagnet for intermittently actuating said impulse mechanism, a spur-wheel provided with a long tooth, a push-pawl on the crutch for actuating said spur-wheel, an insulated sleeve on the arbor of the spur-wheel, contact-plates on the current-reverser, spur-wheel and sleeve, two independent batteries in electric circuit with the contact-plates of the current-reverser so as to actuate the electromagnet and impulse mechanism and restore intermittently the normal beats of the pendulum, substantially as set forth.

5. In an electric pendulum clock, the combination of an oscillating pendulum, a crutch for said pendulum, an impulse mechanism, a current-reverser partly supported on said crutch and provided with spring-plates at opposite sides of the crutch, a spur-wheel, a push-pawl on the crutch for actuating said spur-wheel, a contact-plate on said spur-wheel, an insulated sleeve on the arbor of the spur-wheel, a contact-plate supported on said sleeve, the contact-plates on the spur-wheel and sleeve contacting alternately with the contact-plates of the current-reverser, said spur-wheel being provided with one longer tooth for producing by the sliding to and fro of the push-pawl on said tooth the repeated actuation of the impulse mechanism, substantially as set forth.

6. In an electric pendulum clock, the combination of an oscillating pendulum, a crutch connected with the same, a weighted impulse-rod, an electromagnet, a balanced armature having a lever-arm for intermittently actuating said impulse-rod, a current-reversing mechanism for actuating said electromagnet, push-pawls supported on said crutch, a seconds-wheel actuated by said pawls so as to impart motion to the arbor of the seconds-hand, said push-pawls being located one below and the other above the seconds-wheel so as to cause practically continuous motion of the same, a beat-regulating device operating in conjunction with the current-reversing mechanism to restore to the pendulum a beat of predetermined length at regular intervals of time, mechanism for transmitting motion from the arbor of the seconds-hand to the arbor of the minute-hand, and mechanism for transmitting motion from the arbor of the minute-hand to the arbor of the hour-hand, substantially as set forth.

7. In an electric pendulum clock, the combination, with a pendulum and its crutch, of a current-reverser consisting of spring-plates supported on suitable arms at both sides of the crutch and provided with parallel platinum contact-plates, a spur-wheel, a push-pawl on the crutch for actuating said spur-wheel, an insulated sleeve on the arbor of the spur-wheel, and contact-plates on the spur-wheel and sleeve respectively, said contact-plates being in the same vertical plane with the contact-plates of the current-reverser, substantially as set forth.

8. In an electric pendulum clock, the combination, with a pendulum and its crutch, of a current-reverser consisting of spring-plates supported on adjustable rods applied to said crutch at opposite sides of the same, said spring-plates being provided with platinum contact-plates, a spur-wheel located between said spring-plates, a platinum contact-plate on said spur-wheel, an insulated sleeve on the arbor of the spur-wheel, a radial arm extending from said insulating-sleeve and provided with a contact-plate on its outer end, the contact-plate on the spur-wheel and the contact-plate on the radial arm being in the same plane as the contact-plates of the current-reverser, and a push-pawl on the crutch adapted to engage the teeth of the rotary spur-wheel, one tooth of said spur-wheel being made of greater length than the remaining teeth, substantially as set forth.

9. In an electric pendulum clock, the combination of the actuating-electromagnet, an armature for the same, an armature-lever on said armature, one end of said armature-lever being weighted, an insulating-sleeve on the opposite end of said armature-lever, an adjustable end for the armature-lever supported in said sleeve, a spring-cushioned rod for supporting the armature-lever and a pneumatic brake for said supporting-rod, substantially as set forth.

In testimony that we claim the foregoing as our invention we have signed our names in presence of two subscribing witnesses.

FREDERICK HAENICHEN.
OTTO A. HAENICHEN.

Witnesses:
RICHARD HAENICHEN,
L. ALFRED REY.